(12) United States Patent
Lips

(10) Patent No.: US 11,952,190 B2
(45) Date of Patent: Apr. 9, 2024

(54) REMOVEABLE BAND FOR STACK OF DISPOSABLE CUTLERY

(71) Applicant: GPCP IP Holdings LLC, Atlanta, GA (US)

(72) Inventor: Erik Lips, Greenville, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 393 days.

(21) Appl. No.: 16/370,107

(22) Filed: Mar. 29, 2019

(65) Prior Publication Data
US 2020/0307882 A1 Oct. 1, 2020

(51) Int. Cl.
| | |
|---|---|
| *B65D 71/02* | (2006.01) |
| *B65D 63/10* | (2006.01) |
| *B65D 71/14* | (2006.01) |
| *B65D 75/02* | (2006.01) |
| *B65D 75/52* | (2006.01) |
| *A47F 1/10* | (2006.01) |
| *C09J 7/21* | (2018.01) |

(52) U.S. Cl.
CPC ......... *B65D 71/02* (2013.01); *B65D 63/1009* (2013.01); *B65D 71/14* (2013.01); *B65D 75/02* (2013.01); *B65D 75/52* (2013.01); *A47F 2001/103* (2013.01); *B65D 2563/101* (2013.01); *B65D 2585/00* (2013.01); *C09J 7/21* (2018.01); *C09J 2301/204* (2020.08); *C09J 2400/283* (2013.01); *Y10T 428/2843* (2015.01); *Y10T 428/2848* (2015.01)

(58) Field of Classification Search
CPC .................................................. B65D 2585/00
See application file for complete search history.

(56) References Cited

U.S. PATENT DOCUMENTS

| | | | |
|---|---|---|---|
| 2,170,147 A | 8/1939 | Lane | |
| 2,271,632 A * | 2/1942 | Diehl | B65D 71/02 206/451 |
| 3,851,762 A | 12/1974 | Liblick | |
| 3,987,901 A | 10/1976 | Dullinger | |

(Continued)

FOREIGN PATENT DOCUMENTS

| | | | |
|---|---|---|---|
| CA | 2939923 A1 * | 8/2015 | ........... B32B 27/065 |
| CA | 3021819 A1 | 11/2018 | |

(Continued)

OTHER PUBLICATIONS

International Search Report and Written Opinion mailed in International Application No. PCT/US2019/014173 dated Jul. 3, 2019.

(Continued)

*Primary Examiner* — Anish P Desai

(57) ABSTRACT

A removeable band for confining a stack of cutlery pieces. The band can include a body having a first surface and a second surface that oppose one another, the body being an elongated strip of fiber-based material. A coating can be disposed on at least a portion of the first surface of the body, and an adhesive section can be disposed on at least a portion of the coating. The adhesive section can be configured to adhere to the second surface of the body when a first end and a second end of the body at least partially overlap to form a continuous band.

17 Claims, 5 Drawing Sheets

(56) References Cited

U.S. PATENT DOCUMENTS

| | | | |
|---|---|---|---|
| 4,173,676 A * | 11/1979 | Asakura | C09J 7/243 |
| | | | 428/332 |
| 4,524,512 A | 6/1985 | Formo | |
| 5,496,599 A | 3/1996 | Schwartz | |
| 5,785,354 A | 7/1998 | Haas | |
| 5,904,250 A | 5/1999 | De Schutter | |
| 6,235,386 B1 * | 5/2001 | Bloch | B32B 27/36 |
| | | | 428/345 |
| 7,325,376 B1 | 2/2008 | DiNello et al. | |
| 8,152,004 B2 | 4/2012 | Smith | |
| 9,226,598 B1 | 1/2016 | Knope et al. | |
| 9,643,202 B2 * | 5/2017 | Sackler | B05B 12/24 |
| 10,704,254 B2 * | 7/2020 | Seabaugh | B32B 27/32 |
| 10,889,419 B2 * | 1/2021 | Lips | B65D 75/522 |
| 2001/0041261 A1 * | 11/2001 | Tozuka | C09J 7/38 |
| | | | 428/349 |
| 2007/0108141 A1 | 5/2007 | Smith | |
| 2007/0131741 A1 | 6/2007 | Fransen | |
| 2009/0038123 A1 | 2/2009 | Coronel | |
| 2010/0099318 A1 * | 4/2010 | Suzuki | C09J 133/08 |
| | | | 442/151 |
| 2014/0087109 A1 * | 3/2014 | Huang | B32B 3/28 |
| | | | 428/36.5 |
| 2015/0041484 A1 | 2/2015 | Oakes | |
| 2015/0237938 A1 | 8/2015 | O'Neill | |
| 2019/0125112 A1 | 5/2019 | Mithal | |

FOREIGN PATENT DOCUMENTS

| | | |
|---|---|---|
| WO | WO2001005280 A1 | 1/2001 |
| WO | WO2001005281 A1 | 1/2001 |
| WO | 2007049982 A1 | 5/2007 |
| WO | 2010000096 A1 | 1/2010 |
| WO | WO2017139525 A1 | 8/2017 |
| WO | WO2017139527 A1 | 8/2017 |
| WO | 2017176918 A1 | 10/2017 |

OTHER PUBLICATIONS

European Search Report for 06009258.2, dated Jul. 24, 2006, five pages, Munich, Germany.

International Search Report and Written Opinion for PCT/US2007/083922, dated Nov. 17, 2008.

International Search Report and Written Opinion for PCT/US2011/058329 dated Feb. 29, 2012.

International Search Report and Written Opinion for PCT/US2011/058767 dated Feb. 29, 2012.

Photo of Senco® nails. Photograph taken on Jun. 12, 2005.

\* cited by examiner

REMOVEABLE BAND FOR STACK OF DISPOSABLE CUTLERY

BACKGROUND

Field

Embodiments described generally relate to disposable cutlery. More particularly, embodiments described relate to removable bands for retaining stacks of disposable cutlery.

Description of the Related Art

Disposable cutlery can be typically found in fast-food and take out restaurants as well as populated venues like sporting events, airports, train stations and the like. Cutlery dispensers have been used to provide a protective environment for the disposable cutlery housed within. Conventional cutlery dispensers, however, have challenges and issues delivering pieces of cutlery to a consumer in a repeatable and reliable manner Conventional cutlery dispensers typically suffer from one or more pieces of cutlery getting jammed within the dispenser and not able to be dispensed without time consuming attention and disassembly, which exposes the contents inside, i.e. the cutlery, to the surrounding environment. Conventional cutlery dispensers also have difficulties associated with re-loading cutlery and maintaining a reliable supply of cutlery for user demand.

Non-cartridge-type dispensers have been used to store and contain disposable cutlery by confining a stack of cutlery with a band. By banding the cutlery, the individual pieces of cutlery are confined and held together during shipping and storage. The banding also allows a significant number of cutlery pieces to be reliably loaded into a cutlery dispenser where the individual pieces of cutlery can be reliably dispensed one at a time directly to the user on demand.

Conventional bands used for confining the plurality of cutlery are typically removed after the cutlery has been loaded into the dispenser. In order to do this, the band must be able to sufficiently store and hold the stack together prior to and during the loading/re-filling process as well as be able to be removed after the stack of cutlery is loaded in place without disturbing the stack within the dispenser.

There is a need, therefore, for a band strong enough to hold a stack of cutlery together during storage and transit, and at the same time capable of being removed from within a dispenser without disturbing the loaded stack.

SUMMARY

A removeable band for confining a stack of cutlery pieces is provided herein. In at least one embodiment, the band can include a body having a first surface and a second surface that oppose one another, the body being an elongated strip of fiber-based material. A coating can be disposed on at least a portion of the first surface of the body, and an adhesive section can be disposed on at least a portion of the coating. The adhesive section can be configured to adhere to the second surface of the body when a first end and a second end of the body at least partially overlap to form a continuous band.

DETAILED DESCRIPTION

Figure 1:
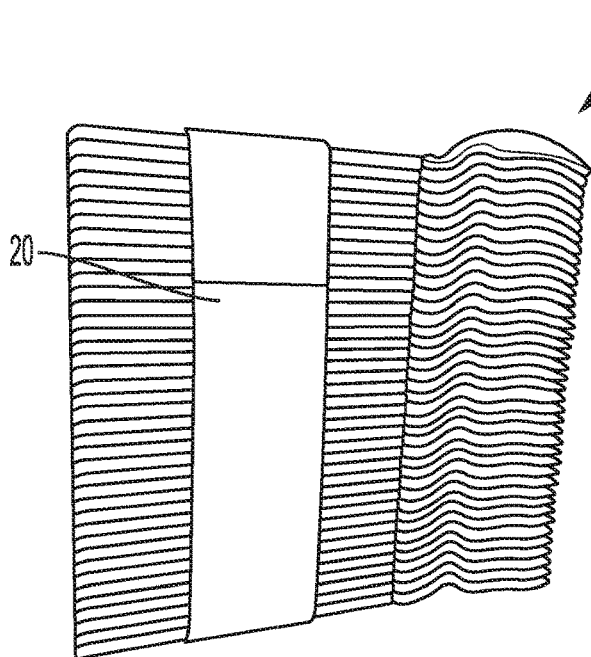
FIG. 1 depicts a perspective view of an illustrative banded stack of cutlery, according to one or more embodiments provided herein.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows can include embodiments in which the first and second features are formed in direct contact and can also include embodiments in which additional features can be formed interposing the first and second features, such that the first and second features cannot be in direct contact. The exemplary embodiments presented below also can be combined in any combination of ways, i.e., any element from one exemplary embodiment can be used in any other exemplary embodiment, without departing from the scope of the disclosure. The figures are not necessarily to scale and certain features and certain views of the figures can be shown exaggerated in scale or in schematic for clarity and/or conciseness Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure can be exact or approximate values ("about") unless otherwise specifically stated. Accordingly, various embodiments of the disclosure can deviate from the numbers, values, and ranges disclosed herein without departing from the intended scope.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same can be equally effective at various angles or orientations.

The term "disposable cutlery" means any cutlery intended for a single use although the cutlery can be used more than once, as desired by the end user. The term "disposable cutlery" does not include or relate to non-disposable cutlery, which is commonly referred to as "flatware" or "silverware". Suitable disposable cutlery can include or be made entirely from one or more polymeric materials, such as polystyrene, polyethylene or polypropylene, as well as blends and copolymers thereof. Such suitable disposable cutlery can include one or more fillers, as would be known to one of ordinary skill in the art. Methods for making suitable disposable cutlery is described in, for example, U.S. Patent Publication No. 2003/0015824, the entirety of which is incorporated herein by reference.

Unless the context clearly indicates otherwise, the terms "cutlery" and "utensil" are used interchangeably herein to refer to a fork, knife, spoon (including a soup spoon), spork or other types of cutlery.

FIG. 1A depicts a perspective view of an illustrative stack of cutlery 10, according to one or more embodiments. The term "stack" refers to a configuration having multiple cutlery pieces aligned in a formation. The number of cutlery pieces in the stack 10 can vary. For example, the number of cutlery pieces in a stack can be about 2, 10, 20, 30, 40, 50, 60, 80, 100, 120, 150, 200 or more, where any of these values above can form an upper or lower endpoint. For example, the number of cutlery pieces in a stack 10 can be about 20 to about 100; about 40 to about 120; or about 30 to about 60. The type of cutlery can also vary. For example, the cutlery can be knives, forks, spoons, or sporks. Usually each piece of cutlery within a stack is the same, but it is conceivable to mix and match the types of cutlery in the same stack.

The stack of cutlery 10 can be confined or otherwise held together using one or more bands 20. The one or more bands 20 can be placed around the stack of cutlery 10 to confine and hold the cutlery pieces together, such as during transport and storage. The one or more bands 20 placed around the stack of cutlery 10 also facilitates the loading of the cutlery within a dispenser as will be explained in more detail below.

Each band 20 can be located about a mid-section of the cutlery. For example, each band 20 can be located around the stack of cutlery 10 between the functional end of the cutlery and the end of the handle, as depicted in FIG. 1A. As such, the band(s) 20 does not cover either end of the cutlery pieces. As explained below, this configuration significantly simplifies the removal of the band(s) 20 after the cutlery stack 10 is loaded in a dispenser.

Figure 2:
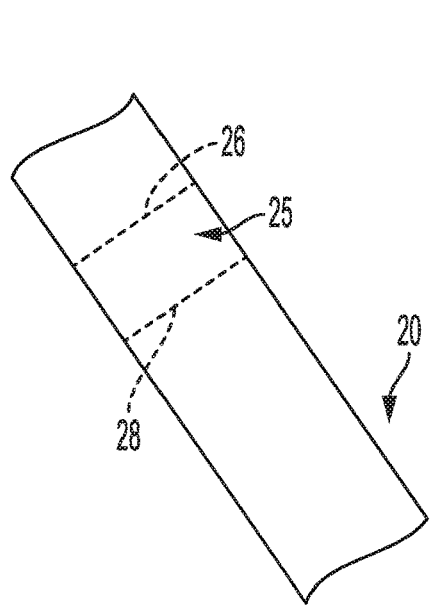
FIG. 2 depicts a perspective side view of an illustrative band having a removeable tab, according to one or more embodiments provided herein.

FIG. 2 depicts a perspective view of an alternative embodiment of the band 20 having a removeable tab 25. The tab 25 can be defined by a first set of one or more perforations 26 formed in the body and axially spaced from a second set of one or more perforations 28 formed in the body such that the perforations 26, 28 allow the tab 25 to be separated and removed from the rest of the band 20, disconnecting the loop.

Figure 3A:
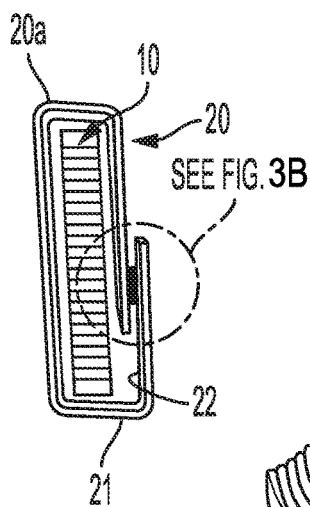
FIG. 3A depicts an illustrative end view of the banded stack of cutlery of FIG. 1, according to one or more embodiments provided herein.
Figure 3C:
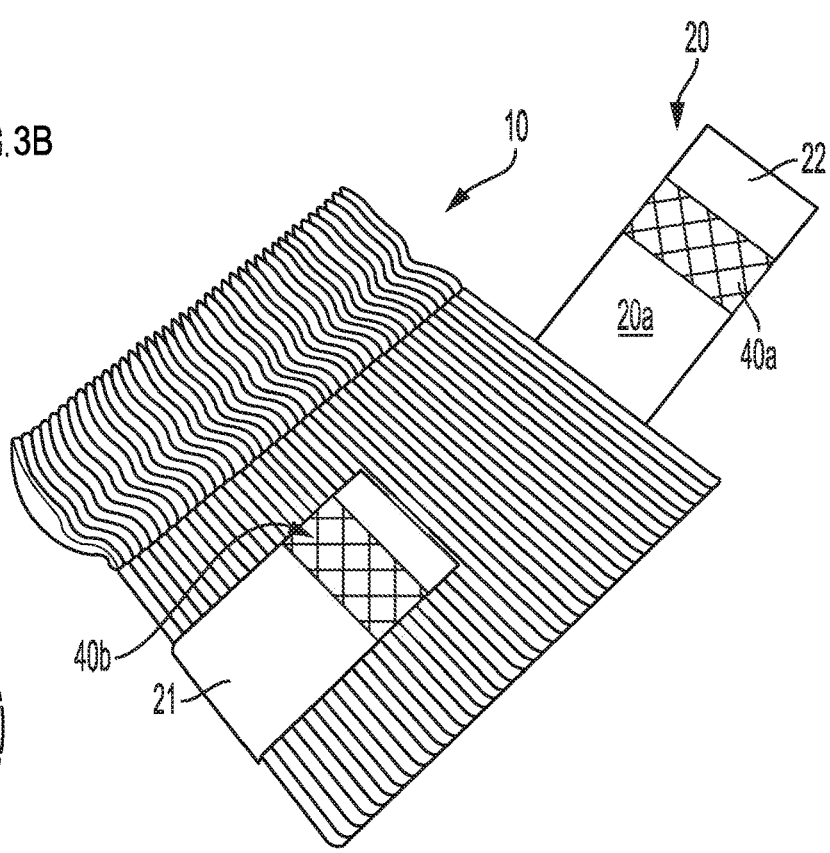
FIG. 3C depicts a perspective view of another illustrative band having a self-sealing adhesive section formed thereon, according to one or more embodiments provided herein
Figure 3B:
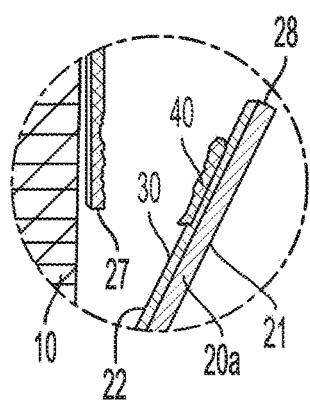
FIG. 3B depicts an enlarged sectional view the banded stack of cutlery shown in FIG. 3A after an adhesive section of the band has been separated, according to one or more embodiments provided herein.

FIG. 3A depicts an illustrative end view of the banded stack of cutlery 10 and FIG. 3B depicts an enlarged sectional view of the banded stack 10 after an adhesive section 40 of the band 20 has been separated. Considering the band 20 in more detail, the band 20 can include a body 20a having a first side or first surface 21 and a second side or second surface 22 that oppose one another. In use, the band 20 can be connected proximate its two ends 27, 28 to form a continuous loop. By "end" of the band 20, it is meant the opposing extremities of the body 20a of the band 21. The term "end" is not meant to be limited to the most extreme boundary of the body 20a but is meant to refer to and include a portion of the body 20a that is adjacent or near the extreme boundary. This can include the last 1%, 5%, 10%, 20%, or 25% of the length of the body 20a as measured from the very end point of the body 20a.

The body 20a can be an elongated strip of fiber-based material, polymeric material or combinations thereof. The band 20 can also be a combination of materials such that one region or section can be made from, for example, a fiber-based material and another region or section can be made from a polymeric material or a different kind of fiber-based material.

A suitable fiber-based material can be a paper-based material. In one form, the band 10 can be a strip of paper or paperboard. Commercially available paperboard material that may be used include, but is not limited to, solid bleached sulfate (SBS) board, bleached virgin board, unbleached virgin board, recycled bleached board, recycled unbleached board, or any combination thereof.

Each side 21, 22 of the body 20a can be uncoated or at least partially coated with one or more suitable coating materials. Either side 21, 22 of the body 20a or both sides 21, 22 may be uncoated, e.g., free or substantially free from wax, clay, polymeric, or other coating material. Where applied, the coating 30 can cover the entire length of the body 20a or only a portion thereof. The coating 30 can be applied on or near one end of the body 20a (the end 28 is shown). In other embodiments, the coating 30 is applied on or near one end of the body 20a (the end 28 is shown) on only one side 21 or 22 of the body 20a. For example, the coating 30 can be applied at the very end 28 of the body 20a and about 45%, about 30%, about 20%, about 15%, about 10%, about 5%, or about 3% of the way from the end 28 toward the middle of the body 20a. The same can be done on the other end 27 (not shown).

The coating 30 can be or can include one or more waxes, one or more clays, and/or one or more polymeric materials. The coating 30 can be or can include, for example, polyethylene, polypropylene, polyester, polyethylene terephthalate, polyamide or any combination thereof. In a particular embodiment, the coating 30 is or includes polyethylene or polylactic acid ("PLA"). In another example, the coating 30 can be or can include a butylene polymer, ethylene polymer, high density polyethylene (HDPE) polymer, medium density polyethylene (MDPE) polymer, low density polyethylene (LDPE) polymer, linear low density polyethylene (LL-DPE), propylene (PP) polymer, isotactic polypropylene (iPP) polymer, high crystallinity polypropylene (HCPP) polymer, ethylene-propylene (EP) copolymers, ethylene-propylene-butylene (EPB) terpolymers, propylene-butylene (PB) copolymer, an ethylene elastomer, ethylene-based plastomer, propylene elastomer and combinations or blends thereof. In another example, the coating 30 can be or can include polypropylene, polyvinylchloride (PVC), polymethylpentene, polybutene-1, polyolefin elastomers, polyisobutylene, ethylene propylene rubber, or any mixture or combination thereof.

The coating 30 can be applied to the body 20a using any suitable process. For example, the coating 30 can be applied by laminating, brushing, spraying, or extrusion. One or more coatings 30 or layers of coatings 30 can be applied. The one or more coatings 30 can be applied on one or both sides 21, 22 of the body 20a, or to any portion of one or both sides 21, 22. The number of layers of coatings 30 can be different and can vary across the length of the body 20a and at various locations about the body 20a.

The total thickness of the resulting monolayer and/or multilayer coating 30 can vary. The coating 30, for example, can have a thickness ranging from a low of about 0.002 mm, about 0.01 mm, or about 0.1 mm to a high of about 0.15 mm, about 0.2 mm, or about 0.35 mm.

Each band 20 can be about 0.05 inches to about 4 inches in width, or from about 1.0 inches to about 3.0 inches in width. The width is defined by the need to prepare a tight confinement of the plurality of cutlery and the need to readily remove the band after loading the stack inside a dispenser. It is possible that each band 10 will need to be smaller or larger to account for the specific shapes of the cutlery being bound and the number of cutlery pieces being stacked together. The overall size of each band 20 can be adjusted, as needed, by the amount of overlap at its ends 27, 28 to obtain a desired size of the loop.

Each band 10 can further include an adhesive layer or section 40. The adhesive section 40 can be located anywhere along the length of the body 20a. In certain embodiments, the adhesive section 40 can be disposed on at least a portion of the coating 30. In certain embodiments, the adhesive section 40 is only disposed on at least a portion of the coating 30. In use, the adhesive section 40 is configured to adhere one surface of the body 20a to the other when the ends 27, 28 of the body 20a are overlapped to form a continuous loop (i.e. band).

The adhesive section 40 can be or can include one more adhesives or adhesive systems disposed thereon. Such adhesives or adhesive systems can be any suitable self-sealing, pressure sensitive or hot melt adhesive. The adhesive can be applied by spraying, brushing, flexographic printing, rotogravure printing, offset printing, screen printing, or any other suitable coating method.

FIG. 3C depicts a perspective view of a band using a self-sealing adhesive. In this embodiment, the band 20 includes at least two adhesives or adhesive sections 40a, 40b disposed or otherwise formed thereon. One adhesive section 40a can be disposed on one side 22 of the band 20, and one other adhesive section 40b can be disposed on the opposite side 21 of the band 20. The adhesive sections 40a, 40b are intended to contact one another and stick together so that the ends of the bands 27, 28 can join, forming the band 20 into a loop.

Each adhesive section 40a, 40b can include one or more adhesives disposed therein. The one or more adhesives can be applied in any shape or pattern, which can vary from one section 40a or 40b to the other. For example, the one or more adhesives in either adhesive section 40a or 40b or both 40, 40b can be disposed as one continuous layer or film, or as one or more lines, circles or dots. The adhesive pattern of section 40a can be the same or different than the adhesive pattern of section 40b. Any suitable self-sealing adhesives can be used. A suitable self-sealing adhesive has little or no tack, but when pressed together the adhesive has a strong resistance to shear and low resistance to peel. In this way, the band 20 can hold the stack of cutlery 10 securely, but when the band 20 is pulled it is able to release easily.

In one embodiment, the adhesive can have a peel strength of 0.2 N/cm to about 1.0 N/cm (as measured according to ASTM D3330, Method A—180° peel test). The adhesive also can have a peel strength that ranges from a low of about 0.2 N/cm, about 0.24 N/cm, or about 0.30 N/cm to a high of about 0.6 N/cm, about 0.75 N/cm, or about 1.0 N/cm. The peel strength, for example, can be about 0.33 N/cm to about 0.58 N/cm; about 0.35 N/cm to about 0.60 N/cm; or about 0.40 N/cm to about 0.53 N/cm. The peel strength also can be about 1.0 N/cm or less, about 0.9 N/cm or less, about 0.8 N/cm or less, about 0.7 N/cm or less, about 0.6 N/cm or less, about 0.5 N/cm or less, about 0.4 N/cm or less, about 0.3 N/cm or less, or about 0.2 N/cm.

In one embodiment, the adhesive can have a shear strength of about 10 N/cm to about 60 N/cm (as measured by TAPPI T494). The adhesive also can have a shear strength that ranges from a low of about 10 N/cm, about 20 N/cm, or about 30 N/cm to a high of about 45 N/cm, about 55 N/cm, or about 60 N/cm. The shear strength also can range from a low of about 12 N/cm, about 18 N/cm, or about 25 N/cm to a high of about 30 N/cm, about 35 N/cm, or about 55 N/cm. The shear strength also can range from about 10 N/cm to about 30 N/cm; about 18 N/cm to about 30 N/cm; about 15 N/cm to about 35 N/cm; or about 20 N/cm to about 35 N/cm.

Figure 4:
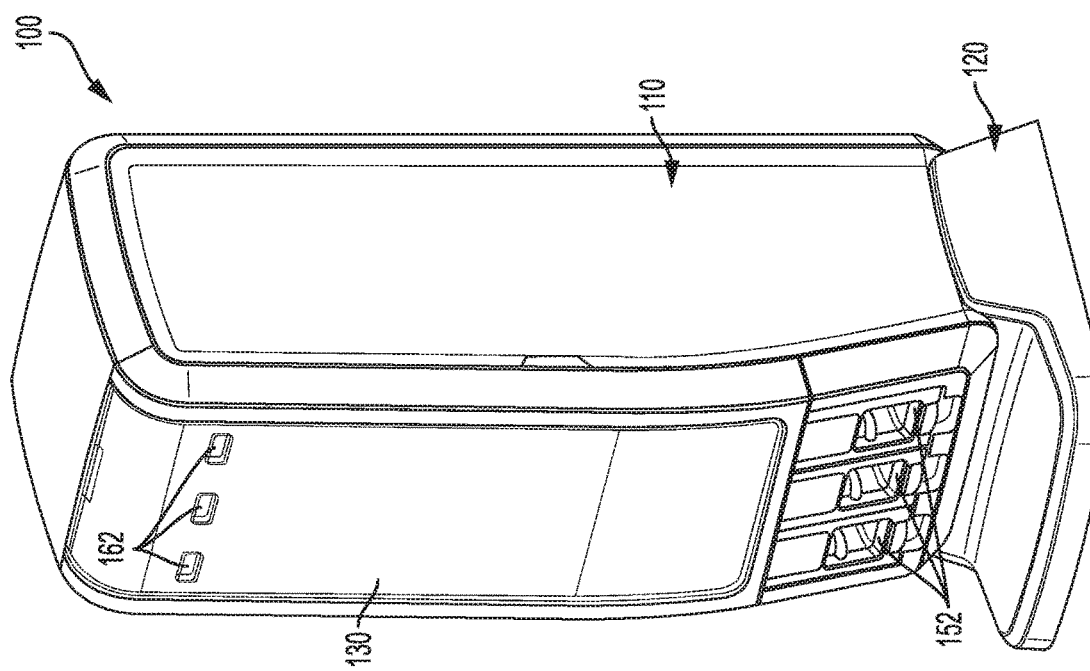
FIG. 4 depicts a perspective view of an illustrative cutlery dispenser, according to one or more embodiments provided herein.

FIG. 4 depicts a perspective view of an illustrative cutlery dispenser 100 suitable for use with the banded stack of cutlery 10, according to one or more embodiments. The cutlery dispenser 100 can include a housing or body 110 having a base 120 and an access door 130. The base 120 can provide support for the dispenser housing 110 and allows the cutlery dispenser 100 to be free standing. The base 120 can be fixedly attached to the bottom of the dispenser housing 110 using one or more fasteners such as screws, bolts, rivets, or any other type of fastener. The dispenser housing 110 can also sit on the base 120 without any form of mechanical fastening. The base 120 can be removable so that the cutlery dispenser 100 can be wall mounted using one more wall mounting attachment holes (not shown in these views).

The access door 130 can swing opened and closed using one or more hinges attached to the dispenser housing 110. The hinge locations can vary and can be located at the top, bottom, or side of the dispenser housing 110. The access door 130 can include one or more fill level apertures or windows 162 that align with corresponding fill level apertures or windows 172 disposed on the dispense chassis 150. As explained further below with reference to FIG. 5, these apertures or windows 162, 172 allow a visual indication of the stock of cutlery within the dispenser to be visible outside the dispenser 100.

Figure 5:
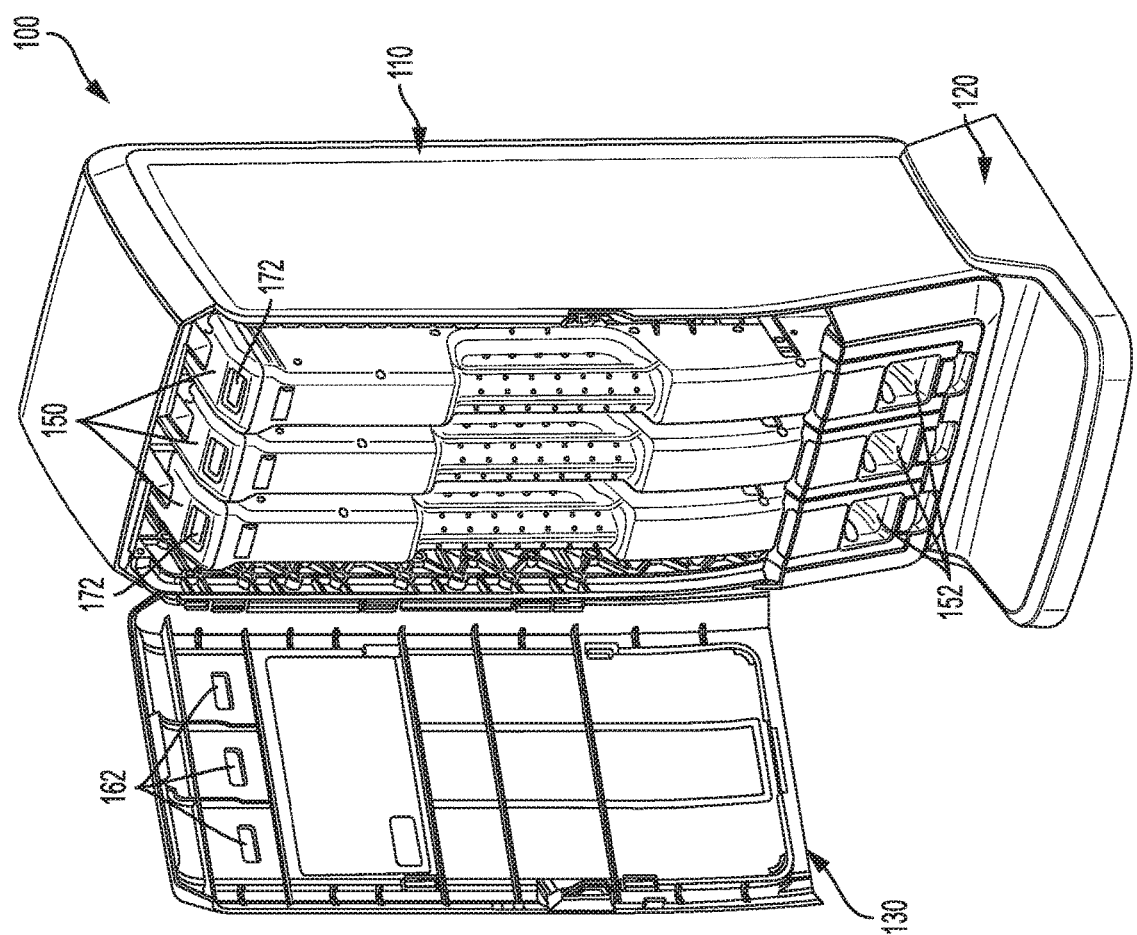
FIG. 5 depicts a perspective view of the illustrative cutlery dispenser of FIG. 4 with its access door open to reveal the dispense chassis located therein, according to one or more embodiments provided herein.

FIG. 5 depicts a perspective view of the illustrative cutlery dispenser of FIG. 4 with its access door 130 open to reveal one or more dispense chassis 150 located therein. Within the dispenser housing 110, the cutlery dispenser 100 can include one or more dispense chassis 150 for dispensing a plurality of cutlery through an access port 152 disposed at one end of each dispense chassis 150. Each dispense chassis 150 can be pre-packaged with cutlery (i.e. knife, fork, spoon, spork, etc.). In some implementations, the dispense chassis 150 is replaced with a new dispense chassis 150 and is not reused. In other implementations, the dispense chassis 150 can be refilled and reused in the cutlery dispenser 100.

The cutlery dispenser 100 can accept any number of more dispense chassis 150. This particular dispenser 100 has room for up to three dispense chassis 150, as depicted. The cutlery dispenser 100 of FIG. 5 is shown with three dispense chassis 150, e.g., one for each of a spoon, fork, and knife, but any combination of cutlery can be used. Any of the dispense chassis 150 can be located within any dispensing position (e.g. left, right, middle for a 3 chassis dispenser) within the dispenser housing 110. Accordingly, a dispense chassis 150 of any type of cutlery can be placed into any available position.

Figure 6:
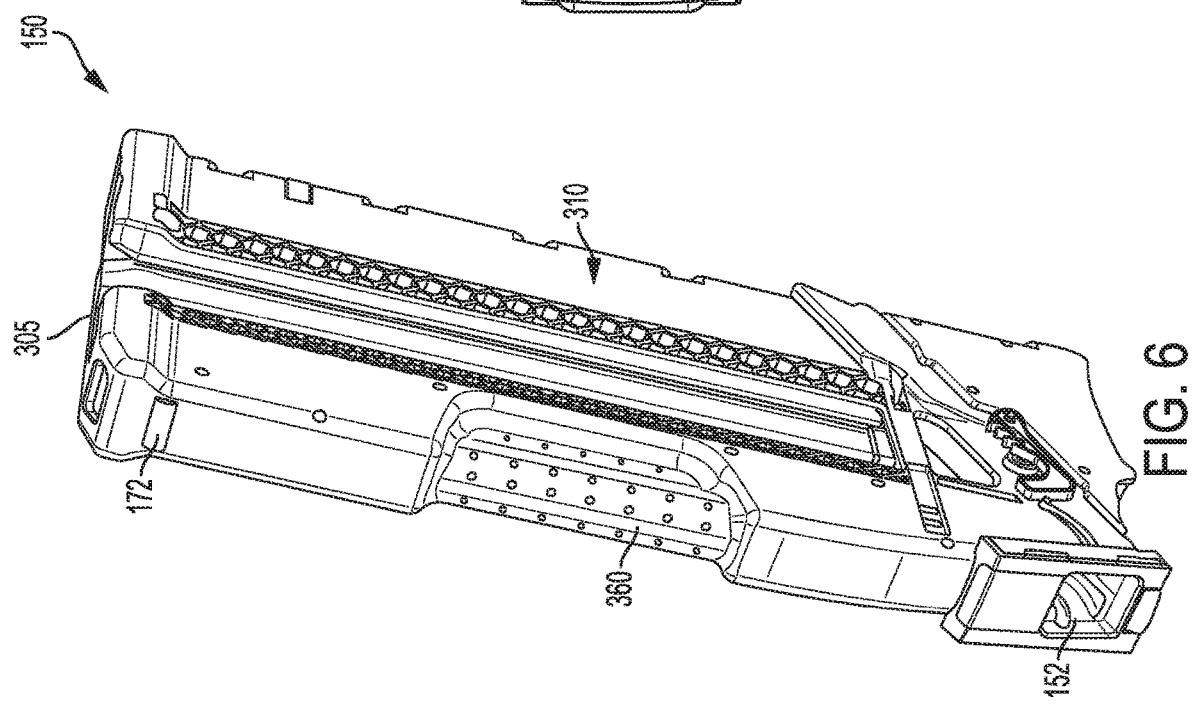
FIG. 6 depicts a side elevation view of an illustrative dispense chassis for use with the dispenser, according to one or more embodiments provided herein.

FIG. 6 depicts a side elevation view of an illustrative dispense chassis 150 for use with the dispenser, according to one or more embodiments. The dispense chassis 150 can include a top 305 disposed on a first or upper end of a chassis body or chassis housing 310. The chassis housing 310 can further include a griper or handle 360 formed in a centrally located section or portion thereof. The handle 360 can provide a point of engagement for service personnel to more sanitarily carry or transport the dispense chassis 150 without having to touch the top 305 or access port 152 where the cutlery will be removed. The handle 360 will also allow a service personnel a point of contact to better manipulate the dispense chassis 150 when loading or loaded in the dispenser 100. Dispense chassis 150 can have one or more corresponding fill level windows 340 that allow a visual indication of the stock of cutlery in each respective dispense chassis 150, as explained below. In other embodiments, the fill level windows 340 can allow a line of sight into the chassis interior from the corresponding sight windows 162 on the access door 130 (FIG. 5).

Figure 7:
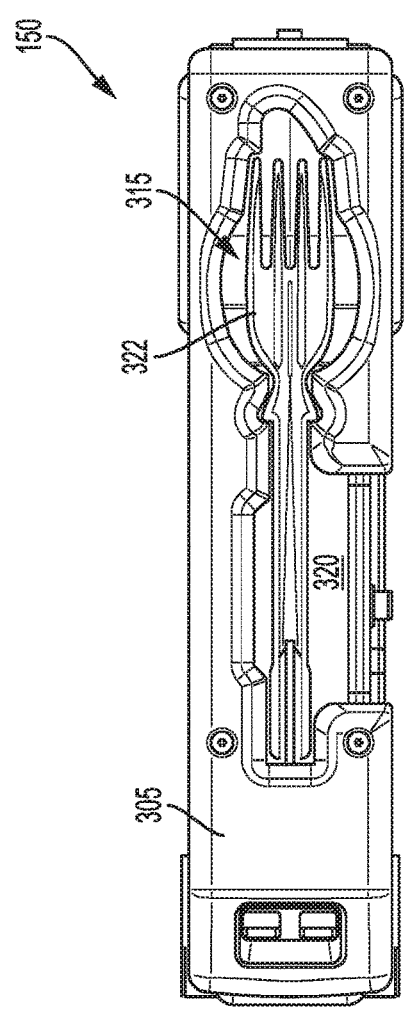
FIG. 7 depicts an illustrative plan view of the dispense chassis depicted in FIG. 6, according to one or more embodiments provided herein.

FIG. 7 depicts an illustrative plan view of the dispense chassis 150 depicted in FIG. 6. As shown, the top 305 of the dispense chassis 150 can include an opening 315 to provide access to a cavity or chamber 320 within the chassis housing 310 for storing cutlery therein. The opening 315 can be universally configured or shaped to allow any type of cutlery 20 to pass through, including for example, a knife, fork (as shown), spoon and spork. Alternatively, each dispense chassis 150 can have a top opening 315 specific to one type of cutlery. In some embodiments, the top 305 can be snap fitted onto the chassis housing 310, so the top 305 can be easily removed or interchanged to customize the cutlery types for a particular dispense chassis 150.

Figure 8:
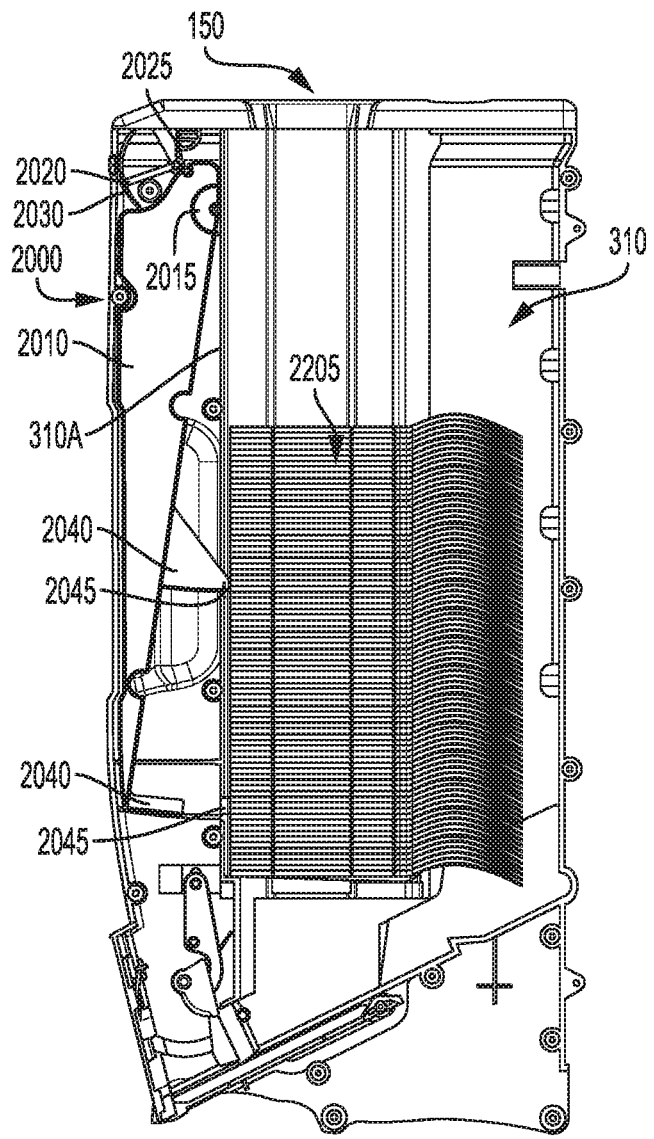
FIG. 8 depicts a cut away side view of the illustrative dispense chassis in which the chassis is loaded with cutlery, according to one or more embodiments provided herein.

Each dispense chassis 150 can be configured with a gauging device to help approximate the number of cutlery within the dispense chassis 150. FIG. 8 provides an illustrative cut away view of a dispense chassis 150 configured with a gauging assembly 2000, according to one or more embodiments. The gauging assembly 2000 can include a first gauge arm 2010 pivotally connected to the chassis housing 310 at pivot 2015, and a second gauge arm 2020 pivotally connected to the chassis housing 310 at pivot 2025. The second gauge arm 2020 can include an indicator 2030 at an external end thereof that can be seen through the apertures or windows 172 on the dispense chassis 150 and the apertures or windows 162 of the access door 130. The indicator 2030 provides a visual indication of the approximate number of cutlery in the stack 2205.

Movement of the first gauge arm 2010 about its pivot connection 2012 can be translated to movement of the second gauge arm 2020 about its pivot connection 2025 to move the indicator 2030 relative to the gauge window 172. In an alternative embodiment that is not shown, the first gauge arm 2010 and the second gauge arm 2020 can be fixed together and can pivot such that movement of the first gauge arm 2010 about the pivot 2012 can be translated into movement of the second gauge arm 2020 to move the indicator 2030 relative to the gauge window 172.

The indicator 2030 can display different quantities of cutlery within the stack 2205, the quantities being visible through the gauge window 172. The indicator 2030 can have different quantities printed on different parts of the indicator 2030. The different quantities can be visible through the gauge window 172 one at a time or multiple quantities can be displayed to show that the level is between the quantities displayed. For example, the indicator 2030 could have "Full" and/or a green color printed on the indicator 2030 that is visible through the gauge window 172 when the dispense chassis 150 has more than a certain amount of cutlery in the cutlery stack 2205, more than 50% full, more than 60% full, more than 70% full more than 80% full, or more than 90% full; "Half-Full" and/or a yellow color printed on the indicator portion that is visible through the gauge window 68 when the dispense chassis 150 has between certain amounts of cutlery 20 in the cutlery stack 2205, between 10% full and 90% full, between 20% full and 80% full, between 30% full and 70% full, between 40% full and 60% full; and/or "Empty" and/or a red color printed on the indicator 2030 that is visible through the gauge window 172 when the dispense chassis 150 has less than a certain amount of cutlery, such as less than 5, less than 4, less than 3, less than 2, or none in the stack 2205. Alternatively, the colors can be used to indicate how many full stacks of cutlery (the number of cutlery in a full stack of cutlery refills can vary) can be added to the dispense chassis 150. For example, where a full stack of cutlery refills is thirty, green can indicate that less than one full stack of cutlery refills will fit within the dispense chassis 150. Yellow can indicate that more than one full stack of cutlery refills can be added to the dispense chassis 150, and red can indicate that two full stacks of cutlery refills can be added to the dispense chassis 150.

The first gauge arm 2010 can include any number of extensions or prongs 2040 that are configured to contact a side of the stack 2205. For example, the first gauge arm 2020 can include 1 prong, 2 prongs, 3 prongs, 4 prongs, or 5 prongs disposed along its length. In one particular embodiment, the first gauge arm 2010 has two prongs as shown in FIG. 8. The prongs 2040 can be disposed on any suitable position along the length of the first gauge arm 2010. If more than two prongs 2040 are used, the spacing between prongs 2040 can be the same or can vary. Although not shown, each prong 2040 can be moveably attached to the first gauge arm 2010 using a clamp or pinch like fastener, so that a prong 2040 can be moved or adjusted along the length of the first gauge arm 2010 based on patterns of use.

The chassis housing 310 can include a gauge aperture or opening 2045 formed through an internal wall 310A through which the prong(s) 2040 can extend and contact a side of the stack 2205. The gauge aperture or opening 2045 can be a recessed section or cut away formed in the internal wall 310A, allowing an adjacent prong 2040 to pass through. Referring to the embodiment shown in FIG. 8, when the height of the cutlery stack 2205 is at or above the first or upper gauge opening 2045, the first or upper prong 2040 moves through the opening 2045 until it contacts the side of the stack 2205. This contact sets the first gauge arm 2010 at a first angle about its pivot 2015, which positions the second gauge arm 2020 at a first angle about its pivot 2025, which positions the indicator 2030 that is visible through the gauge window 172. The position of the indicator 2030 corresponds to a quantity of cutlery in the stack 2205 (i.e. the height of the stack 2205) within the chassis housing 310.

The gauge window 172 can have any suitable height, such as about 2 mm, 3 mm, 5 mm or more, and can display colors, numbers, percentages, or any other indicator to indicate the number of cutlery or stack height within the dispense chassis 150. The first gauge arm 2010 can swing with gravity and with or without a spring assistance. The weight and/or the center of gravity of the first gauge arm 2010 can be adjusted to change how the cutlery stack gauge 2000 operates. The position and/or the number of the prongs 2040 can be adjusted to provide more precise level indicators. Additionally, in an embodiment not shown, the first gauge arm 2010 can be located inside the housing wall 310A such that any one or more of the prongs 2040 can directly contact the cutlery stack 2205 without passing through an opening 2045.

Figure 9:
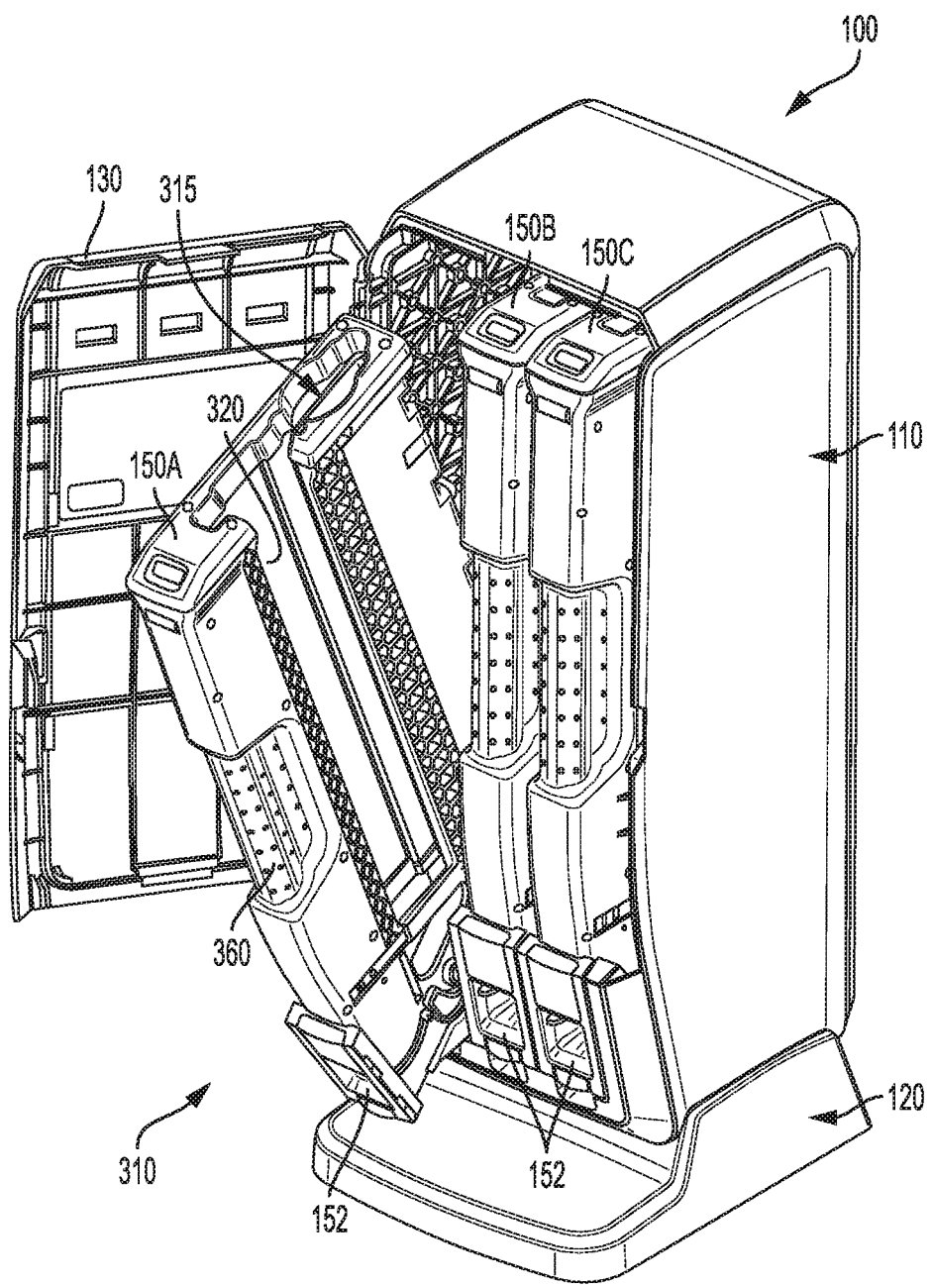
FIG. 9 depicts an illustrative perspective view of the cutlery dispenser having its access door open, allowing a dispense chassis to be loaded, according to one or more embodiments provided herein.

FIG. 9 depicts a perspective view of the illustrative cutlery dispenser 100 showing a first dispense chassis 150A in a loading position, and a second and third dispense chassis 150B, 150C in a dispensing position, according to one or more embodiments. When the dispense chassis 150A is in the loading position, cutlery can be loaded into the first dispense chassis 150A through the loading opening 315. Once loaded, the band 20 can be easily accessed through the opening 320 and removed, leaving the stack of the cutlery within the chassis 150A. Any adhesive residue 67 left on the stack can be removed by hand or other means, or simply left on the stack. The same is true for the other dispense chassis 150B, 150C when time comes to re-load with cutlery. Utensils in any dispense chassis that is in the dispensing position 330 can be dispensed while any one of the other dispense chassis is in a loading position. Any dispense chassis 150 can be moved between a dispensing position and a loading position while remaining connected to the dispenser housing 110.

The present disclosure further relates to any one or more of the following numbered embodiments 1 to 20:

1. A removeable band for confining a stack of cutlery pieces, comprising: a body having a first surface and a second surface that oppose one another, the body being an elongated strip of fiber-based material; a coating disposed on at least a portion of the first surface of the body; and an adhesive section disposed on at least a portion of the coating, the adhesive section configured to adhere to the second surface of the body when a first end and a second end of the body at least partially overlap to form a continuous band.

2. The removeable band according to embodiment 1, wherein the adhesive is a pressure sensitive adhesive or a hot melt adhesive.

3. The removeable band according to embodiments 1 or 2, wherein the coating comprises one or more polyolefins.

4. The removeable band according to any one or more embodiments 1 to 3, wherein the coating comprises low density polyethylene.

5. The removeable band according to any one or more embodiments 1 to 4, wherein the coating comprises biaxially-oriented polypropylene.

6. The removeable band according to any one or more embodiments 1 to 5, wherein the second surface of the body is not coated.

7. The removeable band according to any one or more embodiments 1 to 6, wherein the fiber-based material is paper or paperboard.

8. The removeable band according to any one or more embodiments 1 to 7, wherein the fiber-based material is bleached paperboard.

9. The removeable band according to any one or more embodiments 1 to 8, wherein the body has a thickness of 0.010 inches or more.

10. The removeable band according to any one or more embodiments 1 to 9, wherein the body has a thickness of about 0.010 inches to about 0.012 inches.

11. The removeable band according to any one or more embodiments 1 to 10, further comprising a removeable tab disposed within the body, the tab defined by a first set of one or more perforations axially spaced from a second set of one or more perforations formed in the body.

12. A removeable band for confining a stack of cutlery pieces, comprising: a body having a coated surface and an opposing non-coated surface, the body being an elongated strip of fiber-based material; a first adhesive section disposed on at least a portion of the coated surface; and a second adhesive section disposed on at least a portion of the non-coated surface, wherein the first and second adhesives are configured to adhere only to each other.

13. The removeable band according to embodiment 12, wherein the first and second adhesives are made from the same adhesive material.

14. The removeable band according to embodiments 12 or 13, wherein the first and second adhesives are made from different adhesive materials.

15. The removeable band according to any one or more embodiments 12 to 14, wherein the first and second adhesives are made from cohesive materials.

16. The removeable band according to any one or more embodiments 12 to 15, wherein the fiber-based material is paper or paperboard.

17. The removeable band according to any one or more embodiments 12 to 16, wherein the coating comprises low density polyethylene or biaxially-oriented polypropylene.

18. A removeable band for confining a stack of cutlery pieces, comprising: an elongated strip of fiber-based material; a coating disposed on at least a portion of the elongated strip; and an adhesive section disposed only on at least a portion of the coating, the adhesive section configured to adhere to a first end portion of the elongated strip to a second end portion of the elongated strip when the first end portion and the second end portion at least partially overlap to form a continuous band.

19. The removeable band according to embodiment 18, wherein the adhesive is a pressure sensitive adhesive or a hot melt adhesive.

20. The removeable band according to embodiments 18 or 19, wherein the coating comprises low density polyethylene or biaxially-oriented polypropylene, and the fiber-based material is paper or paperboard.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A removeable band for confining a stack of cutlery pieces, comprising:
    a body having a first surface and a second surface that oppose one another, the body being an elongated strip of fiber-based material;
    a coating disposed on at least a portion of the first surface of the body; and
    an adhesive section disposed only on a portion of the coating, wherein:
    a first end of the body and a second end of the body overlap to form a continuous loop,
    the adhesive section is located only between the overlapped first and second ends, and
    the adhesive section adheres the overlapped first end to the second end.

2. The removeable band of claim 1, wherein the adhesive section comprises a pressure sensitive adhesive or a hot melt adhesive.

3. The removeable band of claim 1, wherein the coating comprises one or more polyolefins.

4. The removeable band of claim 1, wherein the coating comprises low density polyethylene.

5. The removeable band of claim 1, wherein the coating comprises biaxially-oriented polypropylene.

6. The removeable band of claim 1, wherein the second surface of the body is not coated.

7. The removeable band of claim 1, wherein the fiber-based material is paper or paperboard.

8. The removeable band of claim 1, wherein the fiber-based material is bleached paperboard.

9. The removeable band of claim 1, wherein the body has a thickness of 0.010 inches or more.

10. The removeable band of claim 1, wherein the body has a thickness of about 0.010 inches to about 0.012 inches.

11. The removeable band of claim 1, further comprising a removeable tab disposed within the body, the tab defined by a first set of one or more perforations axially spaced from a second set of one or more perforations formed in the body.

12. A removeable band for confining a stack of cutlery pieces, comprising:
    an elongated strip of fiber-based material;
    a coating disposed on at least a portion of the elongated strip; and
    an adhesive section disposed on only a portion of the coating, wherein:
    a first end portion of the elongated strip and the second end portion of the elongated strip overlap to form a continuous loop,
    the adhesive section is located only between the overlapped first end portion and the second end portion, and
    the adhesive section adheres the overlapped first end portion to the second end portion.

13. The removeable band of claim 12, wherein the adhesive section comprises a pressure sensitive adhesive or a hot melt adhesive.

14. The removeable band of claim 12, wherein the coating comprises low density polyethylene or biaxially-oriented polypropylene, and the fiber-based material is paper or paperboard.

15. A removeable band for confining a stack of cutlery pieces, comprising:
    a body having a first surface and a second surface that oppose one another, the body being an elongated strip of paper or paperboard;
    a coating disposed on at least a portion of the first surface of the body, wherein the coating comprises low density polyethylene or biaxially-oriented polypropylene;
    an adhesive section disposed only on a portion of the coating, wherein the adhesive section adheres a first end portion of the elongated strip to a second end portion of the elongated strip when the first end portion and the second end portion at least partially overlap to form a continuous loop; and
    a removeable tab disposed within the body, the tab defined by a first set of one or more perforations axially spaced from a second set of one or more perforations formed in the body, wherein the adhesive section comprises a pressure sensitive adhesive or a hot melt adhesive.

16. The removeable band of claim 15, wherein the second surface of the body is not coated.

17. The removeable band of claim 15, wherein the coating covers the entire first surface of the body.

* * * * *